United States Patent [19]

Hasegawa

[11] 4,086,562
[45] Apr. 25, 1978

[54] APPARATUS FOR RECORDING ERRONEOUS OPERATIONS OF PASSENGER PROTECTING APPARATUS FOR MOTOR VEHICLES

[75] Inventor: Akira Hasegawa, Katsuta, Japan

[73] Assignees: Hitachi, Ltd.; Nissan Motor Co., Ltd., both of Japan

[21] Appl. No.: 657,597

[22] Filed: Feb. 12, 1976

[30] Foreign Application Priority Data

Feb. 17, 1975 Japan .................................. 50-18822

[51] Int. Cl.² .............................................. G08B 21/00
[52] U.S. Cl. .............................. 340/52 H; 180/103 A; 280/735; 340/248 A
[58] Field of Search .......................... 340/52 H, 248 A; 307/10 R; 280/735; 180/91, 103 A

[56] References Cited

U.S. PATENT DOCUMENTS

| | | | |
|---|---|---|---|
| 3,849,759 | 11/1974 | Hosaka et al. | 340/52 R |
| 3,890,594 | 6/1975 | Hosaka et al. | 340/52 H |
| 3,949,357 | 4/1976 | Hosaka | 340/52 H |
| 3,964,016 | 6/1976 | Yamada et al. | 340/52 H |
| 4,016,426 | 4/1977 | Nishioka | 307/10 R |

Primary Examiner—John W. Caldwell, Sr.
Assistant Examiner—Joseph E. Nowicki
Attorney, Agent, or Firm—Craig & Antonelli

[57] ABSTRACT

In an apparatus for protecting passengers of a motor vehicle from being injured in the event a collision of the vehicle by utilizing an air cushion bag which is inflated by an electric actuator device operative in response to the collision, an apparatus for recording erroneous inflation of the protection air bag comprises a circuit for detecting the application of electric energy to the actuator device and for determining if such application of electric energy is made through a collision sensing switch which serves to connect the actuator device to an electric energy source upon an actual collision. When the application of the electric energy to the actuator device without the aid of the collision sensing switch is detected upon the inflation of the air bag, such inflation is regarded as the one due to erroneous operation for some reason other than an actual collision and a signal indicative of such inflation is recorded.

13 Claims, 3 Drawing Figures

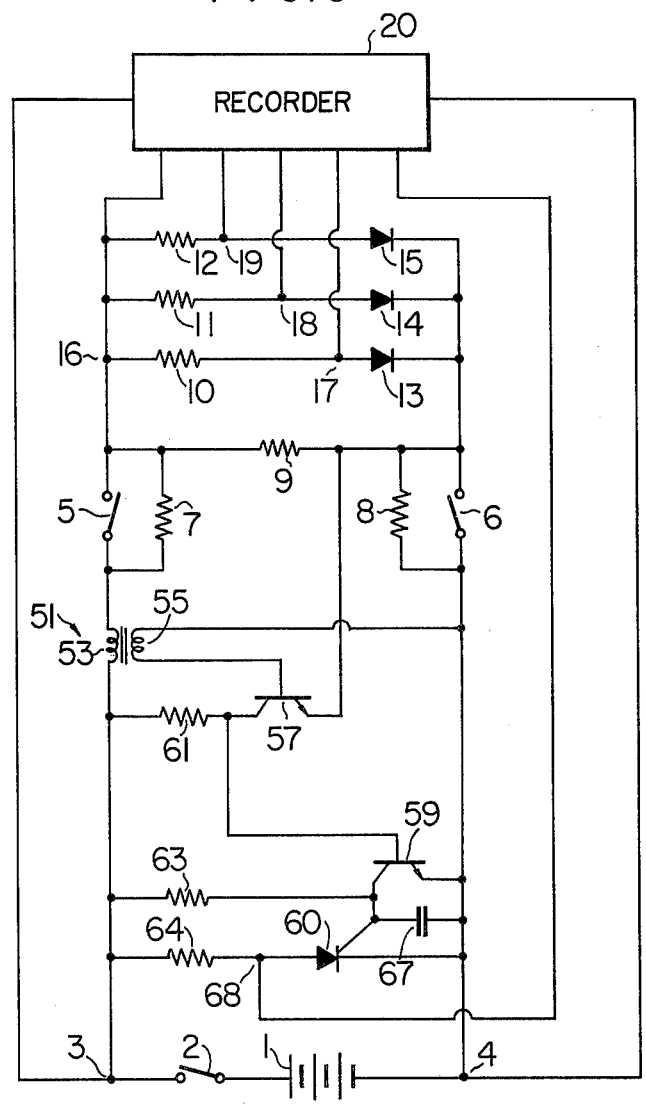

APPARATUS FOR RECORDING ERRONEOUS OPERATIONS OF PASSENGER PROTECTING APPARATUS FOR MOTOR VEHICLES

BACKGROUND OF THE INVENTION

1. Field of the Invention

The present invention relates to an apparatus for recording accidental erroneous operations of a passenger protecting air cushion apparatus provided for a motor car for protecting the occupants from being injured upon collision of the motor vehicle.

2. Description of the Prior Art

The air cushion apparatus for protecting the passengers of the motor vehicle in the event of the collision of the latter may possibly be inflated due to the erroneous operation of the protecting apparatus even when the a collision does not really occur. Such an erroneous or inadvertent inflation of the air cushion or bag is of course undesirable, since the field of view of the driver is obstructed by the inflated bag, which would lead to an accident such as an actual collision of the vehicle. However, it is utterly impossible to suppress absolutely such an erroneous operation. Accordingly, in the event of the occurrence of the collision, it is necessary to determine whether the collision has taken place after the inflation of the air bag due to the erroneous operation of the protecting apparatus or whether the air bag was inflated after the collision. Hithertofore, there has been known no device to make such a determination.

SUMMARY OF THE INVENTION

An object of the present invention is to provide an apparatus for recording only an erroneous operation of an air cushion protecting apparatus which is adapted to record only the inflation of the air bag caused by an inadvertent or erroneous operation of the protecting apparatus for some reason other than an actual collision and the apparatus is inhibited from recording the actual collision.

According to one aspect of the invention, detection is made as to whether an actuating voltage is applied to an actuator means such as an electrical detonator or igniter for inflating the protection cushion such as an air bag. At the same time, it is determined if the application of electric energy to the actuator means is effected through a collision force detecting switch which serves to electrically connect the actuator means to an electric energy source in response to the actual occurrence of the collision. When the application of a voltage to the actuator means has been detected notwithstanding that electric power has not been supplied through the collision force detecting switch, it is determined that the inflation of the air bag has been caused erroneously and the result of the determination is recorded.

BRIEF DESCRIPTION OF THE DRAWINGS

FIG. 3 is a circuit diagram showing a modification of the apparatus shown in FIG. 1.

DETAILED DESCRIPTION OF PREFERRED EOMBODIMENTS

Figure 1:
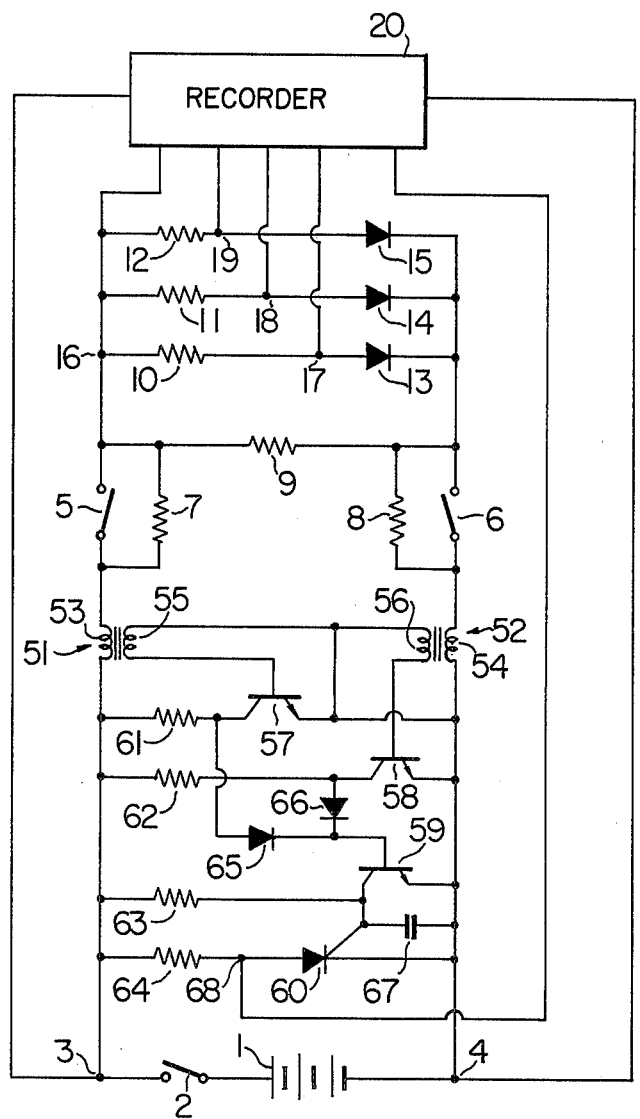
FIG. 1 is a circuit diagram of an apparatus according to the invention.

Referring to FIG. 1, reference numeral 5 indicates a collision force detecting switch having one terminal connected to the anode of a d.c. current source 1 through the primary coil 53 of a current detector transformer 51 and a switch 2. The other terminal of the collision force detector switch 5 is connected at the junction 16 to respective ends of detonators 10, 11 and 12 which have their other ends connected to anodes of diodes 13, 14 and 15, respectively, at junctions 17, 18 and 19. There is provided another collision force detector switch 6 having one terminal connected in common to cathodes of the diodes 13, 14 and 15, while the other end of the switch 6 is connected to a negative electrode of the d.c. current source 1 through the primary coil 54 of a current detection transformer 52.

Figure 2:
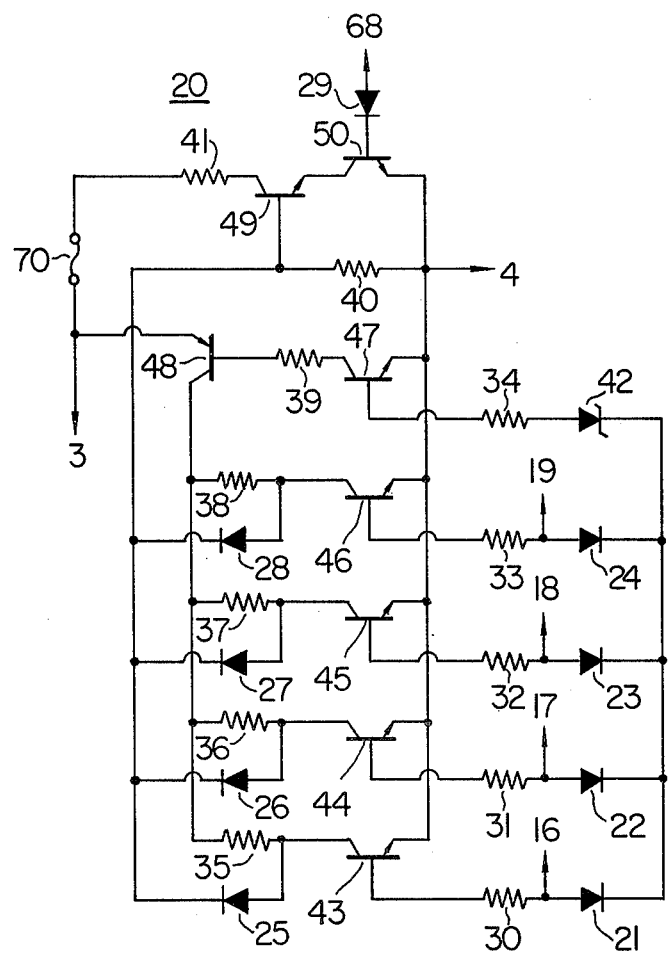
FIG. 2 is a circuit diagram of a recorder employed in the apparatus according to the invention and shows a circuit arrangement of a block denoted by numeral 20 in FIGS. 1 and 3.

A concrete circuit arrangement of a recording unit denoted by a block 20 in FIG. 1 is shown in FIG. 2. In this conjunction, it is noted that the reference numerals 3, 4, 16, 17, 18, 19 and 68 used in FIG. 2 designate the same circuit points as those indicated by these reference numerals in FIG. 1.

Since the circuit connection will be self-explanatory from the drawings, description will now be made as to the operation of the circuit shown in FIGS. 1 and 2.

In FIG. 1, the resistance values of the resistors 7 and 8 are selected sufficiently greater than those of the resistances of the resistor 9 and the detonators 10, 11, 12. Accordingly, in the normal state where no collision occurs, the collision force detector switches 5 and 6 remain off, which results in a substantially equal potential at the junctions 16, 17, 18 and 19 in the order of a half or one third of the voltage of the d.c. current source 1. Under such conditions, the potential applied to the base of the transistor 47 through the Zener diode 42 shown in FIG. 2 is low and the transistor 47 remains off. As a consequence, the transistors 43, 44, 45, 46 and 48 as well as the transistors 49 and 50 will remain in the off or non-conducting state. In this manner, when no collision occurs and the circuit is in the normal state as above mentioned, the recording means 70 will not be driven.

The condition required for assuming an erroneous inflation of the air bag or cushion resides in that at least one of the junctions 16, 17, 18 and 19 is applied with the voltage of the d.c. current source 1 and at the same time one or more of the remaining junctions are grounded. For example, when the wiring (not shown) for the detonator 10 is accidentally short-circuited to the positive electrode of the d.c. current source 1 and additionally the wiring at the side of the junction 18 of the detonator 11 is short-circuited to ground for some reason, a closed loop circuit is formed extending from the d.c. current source 1 through the junction 16 and the detonator 11 to the grounded junction 18, whereby the detonator 11 is energized and the associated air cushion is thereby erroneously inflated. In such a case, the recording circuit will operate in the following manner. At first, the junction 16 becomes at the source potential. As a result, current will flow to the base of the transistor 47 through the diode 21, Zener diode 42 and the resistor 34 shown in FIG. 2, whereby the transistors 47 and 48 are turned on. This results in an increase in the potential at the collectors of the transistors 43 to 46 and the transistors 43, 44 and 46 are turned on. On the other hand, the transistor 45 remain off since the junction 18 is grounded. Thus, the collector potential of the transistor 49 is increased and the correspondingly increased voltage is applied to the base of a transistor 49 through the diode 27. However, since the collision does not actually occur, the collision force detector switches 5 and 6 remain in the off state with an extremely small current flowing through the primary coils 53 and 54 of the current detection transformers 51 and 52. Consequently, the voltages induced in the secondary coils 55 and 56 of the transformers 51 and 52 are sufficiently low to maintain the transistors 57 and 58 in the off state. The transistor 59 is then turned on, while the silicon controlled rectifier 60 is off, to thereby to maintain the junction 68 and hence the base of the transistor 50 in FIG. 2 at a high potential. In this manner, upon the erroneous operation, the base potentials of both the transistors 49 and 50 are increased to turn on these transistors, whereby the recording apparatus 70 is caused to be driven to make the recording of the erroneous operation.

When a collision actually occurs, both of the collision force detector switches 5 and 6 are closed and a large current will flow through the primary coils 53 and 54 of the current detection transformers 51 and 52 to thereby induce a predetermined voltage at the secondary coils 54 and 55 thereof. The transistors 57 and 58 are then turned on, while the transistor 59 is turned off. At this time, the silicon controlled rectifier 60 is gated into the conduction state, resulting in a decreased voltage at the junction 68. The transistor 50 shown in FIG. 2 thus remains in the off or non-conducting state. Under these circumstances, the recording device 70 will never be operated regardless of any variation in the potential at the junctions 16 to 19.

If either one of the collision force detector switches 5 or 6 should be inadvertently actuated, then one of the transistors 57 or 58 will remain on to prevent the silicon controlled rectifier 60 from being switched into conduction, which thus allows the recorcing of the erroneous operation. It will be noted that the capacitor 67 shown in FIG. 1 serves to absorb possible noise signals applied to the gate electrode of the silicon controlled rectifier 60.

FIG. 3 shows another embodiment of the erroneous operation recording circuit according to the invention. In the case of this embodiment, the collision detector portion of the circuit is simplified as compared with the first embodiment shown in FIG. 1. In other words, the current detection transformer 52, transistor 58, diodes 65 and 66 and the resistor 62 of the circuit shown in FIG. 1 are eliminated and the emitter of the transistor 57 is connected to the cathodes of the diodes 13, 14 and 15. The same reference numerals used in FIG. 1 indicate the same components also in FIG. 3.

In the normal state where no collision occurs, when the collision force detection switch 5 in the circuit shown in FIG. 3 is inadvertently actuated and at the same time any one of the junctions 17, 18 and 19 is short-circuited to the ground, the associated one of the detonators 10, 11 and 12 will be erroneously exploded to thereby bring about the inflation of the corresponding air bag. At that time, the emitter voltage of the transistor 57 is substantially equal to the voltage of the d.c. current source 1 with the transistor 57 being off. Thus, the junction 68 rises to a high potential and the recording of the erroneous operation is performed in the manner similar to the case of the circuit shown in FIG. 1.

On the other hand, when a collision of the motor vehicle actually occurs, the collision force detector switches 5 and 6 are turned on and the emitter of the transistor 57 is grounded with the base thereof being applied with the induced voltage of the secondary coil 55 of the current detection transformer 51. The transistor 57 is then turned on, resulting in a reduced potential at the junction 68 in the similar manner as in the case of the circuit of FIG. 1. The recording operation is thus inhibited.

As will be appreciated from the above description, with the erroneous operation recording circuit according to the invention, it is possible to record without fail the inflation of the air cushion or bag due to only the inadvertent operation of the collision detector device and to determine which of the collision and the inflation of the air bag has initially taken place upon the occurrence of the collision of the motor vehicle. According to the invention, the operating state of the collision force detector switches for energizing the detonators are utilized for initiating the operation of the recorder without requiring an additional collision detector switch. This feature contributes to the inexpensive manufacture of the circuit.

I claim:

1. In a control circuit for confiningly protecting a passenger of a motor vehicle in the event of the collision thereof comprising at least an inflatable cushion provided for protecting the passenger from injury in the event of the collision of the motor vehicle, at least one actuating means having first and second terminals, for actuating said inflatable cushion, a d.c. current source having an anode and a cathode, and a collision force detector means for sensing said collision to connect said actuating means to said d.c. current source to thereby actuate said actuating means upon collision of the motor vehicle, the improvement residing in an apparatus for recording an erroneous operation of said control circuit, which improvement comprises an actuation detection circuit for producing an actuation detection signal representing the actuation of said actuating means by detecting a state in which a first terminal of an actuating means is at a potential substantially equal to the potential of the anode of said d.c. current source and at the same time a second terminal of an actuating means is at a potential substantially equal to the potential of the cathode of said d.c. current source, a collision detection circuit for detecting the collision of the motor vehicle in response to the actuation of said collision force detector means and storing the occurrence of the collision as a collision signal, and a recorder adapted to be driven only when said actuation detection signal is produced by said actuation detection circuit and said collision signal is not stored in said collision detection circuit, whereby the erroneous operation of said actuating means is recorded when no collision actually occurs, and wherein said collision force detector means is composed of first and second collision force detecting switches each having first and second terminals, said first terminals being connected, respectively, to the anode and cathode of said d.c. current source, said actuation detecting circuit is composed of first and second voltage divider resistors respectively connected in parallel to said first and second collision force detecting switches, a third voltage divider resistor connected between the second terminals of said first and second collision force detecting switches, and a plurality of diodes each having cathode connected in common to a junction between said second collision force detecting switch and said third voltage divider resistor and each having an anode connected to the first terminal of a respective actuating means, the second terminal of which is connected in common to a junction between said first collision force detecting switch and said third voltage divider resistor, and said recorder is composed of a determining circuit for monitoring a plurality of monitor points formed by the junction between said actuating means and said first collision force detecting switch as well as anode-side junctions of said diodes, respectively, and serving to detect that at least one of said monitor points has a potential greater than a first predetermined reference potential and that at least another one of said monitor points has a potential lower than a second predetermined reference potential, a recording means, and a driving circuit adapted to be actuated by the output of said determining circuit to thereby drive said recording means.

2. An erroneous operation recording apparatus according to claim 1, wherein said collision detector circuit is composed of a first current detection transformer having a primary coil connected in series between the anode of said d.c. current source and said first collision force detecting switch for detecting current flowing through said first collision force detecting switch, a second current detection transformer having a primary coil inserted in series between said cathode of said d.c. current source and said second collision force detecting switch for detecting current flowing through said second collision force detecting switch, a circuit for producing said collision signal when voltages induced in secondary coils of said first and second current detection transformers exceed a third predetermined reference voltage, and a storing and holding circuit for storing said collision signal.

3. An erroneous operation recording apparatus according to claim 2, wherein said determining circuit comprises respective first transistor switching circuits each of which is connected between a respective one of said monitor points and said driving circuit, and a second transistor switching circuit having a control terminal coupled to each monitor point and input and output terminals connected between the anode of said d.c. current source and said first transistor switching circuits.

4. An erroneous operation recording apparatus according to claim 3, wherein said driving circuit comprises a third transistor switching circuit having an input connected to the cathode of said d.c. current source, an output connected to said recording means, a first control terminal connected to said first transistor switching circuits and a second control terminal connected to said storing and holding circuit.

5. An erroneous operation recording apparatus according to claim 4, wherein said storing and holding circuit comprises a controlled rectifier switching circuit having a control input connected to said collision signal producing circuit and an output connected to the second control terminal of said third transistor switching circuit.

6. An erroneous operation recording apparatus according to claim 5, wherein said collision signal producing circuit comprises a fourth transistor switching circuit having a pair of control inputs connected to the secondary coils of said first and second current detection transformers and an output connected to the control input of said controlled rectifier switching circuit.

7. An erroneous operation recording apparatus according to claim 1, wherein said collision detector circuit is composed of a current detection transformer having a primary coil connected in series between the anode of said d.c. current source and said first collision force detecting switch for detecting current flowing through said first collision force detecting switch and a secondary coil coupled with said primary coil, a circuit for producing said collision signal when a voltage induced in said secondary coil of said current detection transformer exceeds a predetermined reference voltage, and a storing and holding circuit for storing said collision signal.

8. An erroneous operation recording apparatus according to claim 7, wherein said determining circuit comprises respective first transistor switching circuits each of which is connected between a respective one of said monitor points and said driving circuit, and a second transistor switching circuit having a control terminal coupled to each monitor point and input and output terminals connected between the anode of said d. c. current source and said first transistor switching circuits.

9. An erroneous operation recording apparatus according to claim 8, wherein said driving circuit comprises a third transistor switching circuit having an input connected to the cathode of said d. c. current source, an output connected to said recording means, a first control terminal connected to said first transistor switching circuits and a second control terminal connected to said storing and holding circuit.

10. An erroneous operation recording apparatus according to claim 9, wherein said storing and holding circuit comprises a controlled rectifier switching circuit having a control input connected to said collision signal producing circuit and an output connected to the second control terminal of said third transistor switching circuit.

11. An erroneous operation recording apparatus according to claim 10, wherein said collision signal producing circuit comprises a fourth transistor switching circuit having a control input connected to the secondary coil of said current detection transformer and an output connected to the control input of said controlled rectifier switching circuit.

12. In a control circuit for confiningly protecting a passenger of a motor vehicle in the event of the collision thereof comprising at least an inflatable cushion provided for protecting the passenger from injury in the event of the collision of the motor vehicle, at least one actuating means having first and second terminals, for actuating said inflatable cushion, a d. c. current source, having an anode and a cathode, and a collision force detector means for sensing said collision to connect said actuating means to said d. c. current source to thereby actuate said actuating means upon collision of the motor vehicle, the improvement residing in an apparatus for recording an erroneous operation of said control circuit, which improvement comprises an actuation detection circuit for producing an actuation detection signal representing the actuation of said actuating means by detecting a state in which a first terminal of an actuating means is at a potential substantially equal to the potential of the anode of said d.c. current source and at the same time a second terminal of an actuating means is at a potential substantially equal to the potential of the cathode of said d. c. current source, a collision detection circuit for detecting the collision of the motor vehicle in response to the actuation of said collision force detector means and storing the occurrence of the collision as a collision signal, and a recorder adapted to be driven only when said actuation detection signal is produced by said actuation detection circuit and said collision signal is not stored in said collision detection circuit, whereby the erroneous operation of said actuating means is recorded when no collision actually occurs, and wherein said collision force detector means is composed of first and second collision force detecting switches for closing paths from the anode and cathode of said d. c. current source in response to the occurrence of a collision, and said collision detection circuit is composed of a first current detection transformer having a primary coil connected in series between the anode of said d. c. current source and said first collision force detecting switch for detecting current flowing through said first collision force detecting switch, a second current detection transformer having a primary coil inserted in series between said cathode of said d. c. current source and said second collision force detecting switch for detecting current flowing through said second collision force detecting switch, a circuit for producing said collision signal when voltages induced in secondary coils of said first and second current detection transformers exceed a predetermined reference voltage, and a storing and holding circuit for storing said collision signal.

13. In a control circuit for confiningly protecting a passenger of a motor vehicle in the event of the collision thereof comprising at least an inflatable cushion provided for protecting the passenger from injury in the event of the collision of the motor vehicle, at least one actuating means having first and second terminals, for actuating said inflatable cushion, a d. c. current source having an anode and a cathode, and a collision force detector means for sensing said collision to connect said actuating means to said d. c. current source to thereby actuate said actuating means upon collision of the motor vehicle, the improvement residing in an apparatus for recording an erroneous operation of said control circuit, which improvement comprises an actuation detection circuit for producing an actuation detection signal representing the actuation of said actuating means by detecting a state in which a first terminal of an actuating means is at a potential substantially equal to the potential of the anode of said d. c. current source and at the same time a second terminal of an actuating means is at a potential substantially equal to the potential of the cathode of said d.c. current source, a collision detection circuit for detecting the collision of the motor vehicle in response to the actuation of said collision force detector means and storing the occurrence of the collision as a collision signal, and a recorder adapted to be driven only when said actuation detection signal is produced by said actuation detection circuit and said collision signal is not stored in said collision detection circuit, whereby the erroneous operation of said actuating means is recorded when no collision actually occurs, and wherein said collision force detector means is composed of first and second collision force detecting switches for closing paths from the anode and cathode of said d. c. current source in response to the occurrence of a collision, and said collision detector circuit is composed of a current detection transformer having a primary coil connected in series between the anode of said d. c. current source and said first collision force detecting switch for detecting current flowing through said first collision force detecting switch and a secondary coil coupled with said primary coil, a circuit for producing said collision signal when a voltage induced in said secondary coil of said current detection transformer exceeds a predetermined reference voltage, and a storing and holding circuit for storing said collision signal.

* * * * *